(12) United States Patent
Abodunrin et al.

(10) Patent No.: US 11,531,752 B2
(45) Date of Patent: Dec. 20, 2022

(54) TECHNOLOGIES FOR CONTROL PLANE SEPARATION IN A NETWORK INTERFACE CONTROLLER

(71) Applicant: Intel Corporation, Santa Clara, CA (US)

(72) Inventors: Akeem Abodunrin, Hillsboro, OR (US); Lev Faerman, Gan-Yavneh (IL); Scott Dubal, Beaverton, OR (US); Suyog Kulkarni, Portland, OR (US); Anjali Singhai Jain, Portland, OR (US); Eliel Louzoun, Jerusalem (IL); Nrupal Jani, Hillsboro, OR (US); Yadong Li, Portland, OR (US); Eliezer Tamir, Bait Shemesh (IL); Arvind Srinivasan, San Jose, CA (US); Ben-Zion Friedman, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 815 days.

(21) Appl. No.: 16/142,693

(22) Filed: Sep. 26, 2018

(65) Prior Publication Data
US 2019/0042741 A1    Feb. 7, 2019

(51) Int. Cl.
G06F 21/55 (2013.01)
G06F 13/40 (2006.01)
G06F 21/53 (2013.01)

(52) U.S. Cl.
CPC ........ G06F 21/554 (2013.01); G06F 13/4068 (2013.01); G06F 21/53 (2013.01); G06F 2221/034 (2013.01)

(58) Field of Classification Search
None
See application file for complete search history.

(56) References Cited

U.S. PATENT DOCUMENTS

| | | | |
|---|---|---|---|
| 9,542,350 B1 * | 1/2017 | Kissell | G06F 13/4068 |
| 10,402,576 B2 * | 9/2019 | Tsirkin | G06F 21/53 |
| 10,430,225 B1 * | 10/2019 | Harland | G06F 13/385 |
| 10,860,357 B1 * | 12/2020 | Johnson | G06F 13/4068 |
| 2013/0151685 A1 | 6/2013 | Bursell | |
| 2018/0239649 A1 | 8/2018 | Druzhinin et al. | |

OTHER PUBLICATIONS

European Office Action for Patent Application No. 19183101.5, dated Feb. 19, 2021, 8 pages.

(Continued)

*Primary Examiner* — Christopher C Harris
(74) *Attorney, Agent, or Firm* — Compass IP Law PC

(57) ABSTRACT

Technologies for control plane separation at a network interface controller (NIC) of a compute device configured to transmit, by a resource of the compute device, commands to a physical function managed by a network interface controller (NIC) of the compute device. The NIC is further to establish a data plane separate from a control plane, wherein the control plane comprises one of the trusted control path and the untrusted control path. Additionally, the resource is configured to transmit the commands via one of the trusted control path or the untrusted control path based on a trust level associated with the physical function. Other embodiments are described herein.

22 Claims, 7 Drawing Sheets

(56) References Cited

OTHER PUBLICATIONS

Extended European search report for European patent application No. 19183101.5, dated Nov. 19, 2019 (10 pages).
Zhe Zhou et al., All Your VMs are Disconnected : Attacking Hardware Virtualized Network 11 , Proceedings of the Seventh ACM on Conference on Data and Application Security and Privacy, CODASPY 117, Mar. 22, 2017 (Mar. 22, 2017), pp. 249-260, XP055640755, DOI: 10.1145/3029806.3029810.

* cited by examiner

TECHNOLOGIES FOR CONTROL PLANE SEPARATION IN A NETWORK INTERFACE CONTROLLER

BACKGROUND

Modern computing devices have become ubiquitous tools for personal, business, and social uses. As such, many modern computing devices are capable of connecting to various data networks, including the Internet, to transmit and receive data communications over the various data networks at varying rates of speed. To facilitate communications between computing devices, the data networks typically include one or more network computing devices (e.g., compute servers, storage servers, etc.) to route communications (e.g., via switches, routers, etc.) that enter/exit a network (e.g., north-south network traffic) and between network computing devices in the network (e.g., east-west network traffic). In present packet-switched network architectures, data is transmitted in the form of network packets between networked computing devices. At a high level, data is packetized into a network packet at one computing device and the resulting packet transmitted, via a transmission device (e.g., a network interface controller (NIC) of the computing device), to another computing device over a network.

Upon receipt of a network packet, for example, the computing device typically performs some level of examination on at least a portion of the received network packet to determine what, if any, operations (e.g., drop the network packet, process/store at least a portion of the network packet, forward the network packet, etc.) are to be performed by the computing device. Such operations may require access to hardware of the computing device. For example, in cloud hosting scenarios, a cloud hosting provider may wish to supply their tenants with direct access to such hardware by way of a single physical function on a host server, or entire physical systems, bypassing any provider-owned hypervisor control. Such hosting is commonly referred to as "bare metal" hosting. Typically, the choice of hosting method is up to the tenant/customer. As such, it is often in the provider's interest to use the same physical hardware for both regular and bare metal tenants. However, such a hosting scenario exposes the provider's infrastructure and network, as well as other tenants to be target of attacks by malicious or compromised tenants, since at least a part of the kernel space of the physical machines is in the hands of the customers. In other words, the trust model where the kernel space of the machine is a trusted entity no longer applies.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
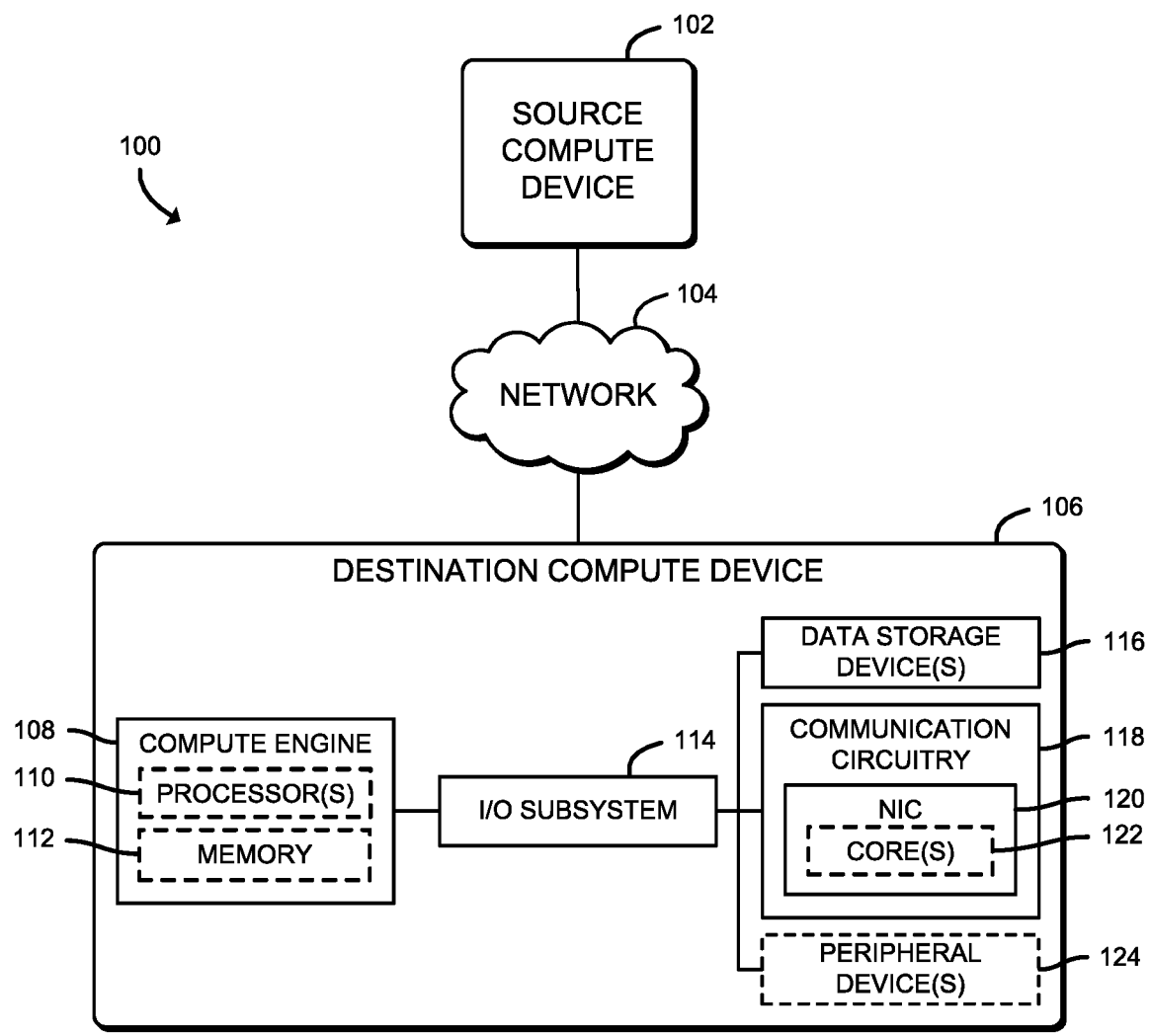
FIG. 1 is a simplified block diagram of at least one embodiment of a system for control plane separation in a network interface controller (NIC) that includes a source compute device and a destination compute device communicatively coupled via a network.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for control plane separation at a network interface controller (NIC) includes a source compute device 102 communicatively coupled to a destination compute device 106 via a network 104. While illustratively shown as having a single source compute device 102 and a single destination compute device 106, the system 100 may include multiple source compute devices 102 and multiple destination compute devices 106, in other embodiments. It should be appreciated that the source compute device 102 and destination compute device 106 have been illustratively designated herein as being one of a "source" and a "destination" for the purposes of providing clarity to the description and that the source compute device 102 and/or the destination compute device 106 may be capable of performing any of the functions described herein. It should be further appreciated that the source compute device 102 and the destination compute device 106 may reside in the same data center or high-performance computing (HPC) environment. In other words, the source compute device 102 and destination compute device 106 may reside in the same network 104 connected via one or more wired and/or wireless interconnects.

In use, the source compute device 102 and the destination compute device 106 transmit and receive network traffic (e.g., network packets, frames, bit streams, etc.) to/from each other, as well as other compute devices in the network 104, as applicable. For example, the destination compute device 106 may receive a network packet from the source compute device 102. Upon receipt of a network packet, the destination compute device 106, or more particularly a network interface controller (NIC) 120 of the destination compute device 106, performs one or more processing operations on at least a portion of the data associated with the received network traffic. To do so, one or more physical functions of the NIC 120 (see, e.g., the physical function 308 of FIG. 3) may be configured to perform such processing.

The one or more physical functions of the NIC 120 may be embodied as a Peripheral Component Interconnect (PCI) function that is capable of performing various operations (e.g., direct memory access (DMA) operations) and otherwise facilitating communications with the I/O subsystem 122. It should be appreciated that each of the physical functions may be used by a virtual machine manager (e.g., the VMM 202 of FIGS. 2 and 3) to manage the NIC 120 and any virtual functions (see, e.g., the virtual functions 306 of FIG. 3) associated therewith. It should be further appreciated that the NIC 120 is configured to perform one or more processing operations on the transmission of network packets, as well, such as performing packet segmentation, verifying whether the sender of the network packet is authorized to send the network packet, etc.

However, unlike traditional NICs, the control plane and data plane of the NIC are separated. To do so, the NIC 120 is configured to classify each physical function as one of a regular physical function, an untrusted physical function, and a control function. The regular physical functions are configured to operate as a default physical function that can perform any operation that a physical function is required to perform, but cannot perform any level of configuration on behalf of another physical function. The untrusted physical functions are configured to perform fast path traffic processing operations, but are blocked from performing certain hardware access/configuration operations. Depending on the embodiment, such as in an input/output virtualization (IOV) embodiment, the untrusted physical functions may also act as IOV initiators to help request creation of more direct assign virtual functions that then can be given off to one or more virtual machines (VMs).

While the NIC 120 is configured to expose the data plane to all physical function types and, therefore, each of which is capable of configuring transmit and receive queues directly and manage all the network traffic as usual, the control plane access is restricted, or otherwise blocked, for the untrusted physical functions. As such, the untrusted physical function loses the ability to issue device resets, change the link configuration, write sensitive/device wide registers, and update the device firmware, etc. To do so, the control plane is relocated to a different entity that is considered trusted, such as a different physical function on the NIC 120 that remains under a host provider's control, contained by the device firmware, placed on a computational core the NIC 120 (e.g., in smart NIC embodiments), in a baseboard manageability controller (BMC) (not shown), a remote driver (e.g., where configuration requests of the data plane controller are forwarded to the remote driver in a console that responds with a message to the internal firmware to configure a component of the destination compute device 106), etc.

Depending on the embodiment, the configuration of the physical function type may be performed by hardware of the destination compute device 106 (e.g., by blocking certain types of hardware access commands/requests) and/or firmware of the device destination compute device 106 (e.g., by configuring the hardware to apply the required blocking and by blocking any software to firmware commands that exceed the trust level of a driver associated with the physical function). In other embodiments, such as those embodiments in which a control physical function resides in an embedded core on the NIC 120, a control physical function may perform the physical function type configuration. Such configuration may be initiated based on one or more settings stored in non-volatile memory, or upon having received a command from a trusted entity such as the basic input/output system (BIOS), the BMC, a control physical function, or remote console, for example. As a result of the restricted access by virtue of the control plane separation, unlike present technologies, regardless of the fact that a potential malicious attacker resides in the kernel space, the attacker is unable to adversely affect device or network operation.

The destination compute device 106 may be embodied as any type of computation or computer device capable of performing the functions described herein, including, without limitation, a computer, a server (e.g., stand-alone, rack-mounted, blade, etc.), a sled (e.g., a compute sled, an accelerator sled, a storage sled, a memory sled, etc.), an enhanced or smart NIC (e.g., a host fabric interface (HFI)), a network appliance (e.g., physical or virtual), a router, switch (e.g., a disaggregated switch, a rack-mounted switch, a standalone switch, a fully managed switch, a partially managed switch, a full-duplex switch, and/or a half-duplex communication mode enabled switch), a web appliance, a distributed computing system, a processor-based system, and/or a multiprocessor system. As shown in FIG. 1, the illustrative destination compute device 106 includes a compute engine 108, an I/O subsystem 114, one or more data storage devices 116, communication circuitry 118, and, in some embodiments, one or more peripheral devices 124. It should be appreciated that the destination compute device 106 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component.

The compute engine 108 may be embodied as any type of device or collection of devices capable of performing the various compute functions as described herein. In some embodiments, the compute engine 108 may be embodied as a single device such as an integrated circuit, an embedded system, a field-programmable-array (FPGA), a system-on-a-chip (SOC), an application specific integrated circuit (ASIC), reconfigurable hardware or hardware circuitry, or other specialized hardware to facilitate performance of the functions described herein. Additionally, in some embodiments, the compute engine 108 may include, or may otherwise be embodied as, one or more processors 110 (i.e., one or more central processing units (CPUs)) and memory 112.

The processor(s) 110 may be embodied as any type of processor(s) capable of performing the functions described herein. For example, the processor(s) 110 may be embodied as one or more single-core processors, multi-core processors, digital signal processors (DSPs), microcontrollers, or other processor(s) or processing/controlling circuit(s). In some embodiments, the processor(s) 110 may be embodied as, include, or otherwise be coupled to an FPGA (e.g., reconfigurable circuitry), an ASIC, reconfigurable hardware or hardware circuitry, or other specialized hardware to facilitate performance of the functions described herein.

The memory 112 may be embodied as any type of volatile or non-volatile memory or data storage capable of performing the functions described herein. It should be appreciated that the memory 112 may include main memory (i.e., a primary memory) and/or cache memory (i.e., memory that can be accessed more quickly than the main memory). Volatile memory may be a storage medium that requires power to maintain the state of data stored by the medium. Non-limiting examples of volatile memory may include various types of random access memory (RAM), such as dynamic random access memory (DRAM) or static random access memory (SRAM).

The compute engine 108 is communicatively coupled to other components of the destination compute device 106 via the I/O subsystem 114, which may be embodied as circuitry and/or components to facilitate input/output operations with the processor 110, the memory 112, and other components of the destination compute device 106. For example, the I/O subsystem 114 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 114 may form a portion of a SoC and be incorporated, along with one or more of the processor 110, the memory 112, and other components of the destination compute device 106, on a single integrated circuit chip.

The one or more data storage devices 116 may be embodied as any type of storage device(s) configured for short-term or long-term storage of data, such as, for example, memory devices and circuits, memory cards, hard disk drives, solid-state drives, or other data storage devices. Each data storage device 116 may include a system partition that stores data and firmware code for the data storage device 116. Each data storage device 116 may also include an operating system partition that stores data files and executables for an operating system.

The communication circuitry 118 may be embodied as any communication circuit, device, or collection thereof, capable of enabling communications between the destination compute device 106 and other computing devices, such as the source compute device 102, as well as any network communication enabling devices, such as an access point, network switch/router, etc., to allow communication over the network 104. Accordingly, the communication circuitry 118 may be configured to use any one or more communication technologies (e.g., wireless or wired communication technologies) and associated protocols (e.g., Ethernet, Bluetooth®, Wi-Fi®, WiMAX, LTE, 5G, etc.) to effect such communication.

It should be appreciated that, in some embodiments, the communication circuitry 118 may include specialized circuitry, hardware, or combination thereof to perform pipeline logic (e.g., hardware algorithms) for performing the functions described herein, including processing network packets (e.g., parse received network packets, determine destination computing devices for each received network packets, forward the network packets to a particular buffer queue of a respective host buffer of the destination compute device 106, etc.), performing computational functions, etc.

In some embodiments, performance of one or more of the functions of communication circuitry 118 as described herein may be performed by specialized circuitry, hardware, or combination thereof of the communication circuitry 118, which may be embodied as a SoC or otherwise form a portion of a SoC of the destination compute device 106 (e.g., incorporated on a single integrated circuit chip along with a processor 110, the memory 112, and/or other components of the destination compute device 106). Alternatively, in some embodiments, the specialized circuitry, hardware, or combination thereof may be embodied as one or more discrete processing units of the destination compute device 106, each of which may be capable of performing one or more of the functions described herein.

The illustrative communication circuitry 118 includes the NIC 120, which may also be referred to as a host fabric interface (HFI) in some embodiments (e.g., high performance computing (HPC) environments). The NIC 120 may be embodied as any type of firmware, hardware, software, or any combination thereof that facilitates communications access between the destination compute device 106 and a network (e.g., the network 104). For example, the NIC 120 may be embodied as one or more add-in-boards, daughtercards, network interface cards, controller chips, chipsets, or other devices that may be used by the destination compute device 106 to connect with another compute device (e.g., the source compute device 102).

In some embodiments, the NIC 120 may be embodied as part of a SoC that includes one or more processors, or included on a multichip package that also contains one or more processors. As illustratively shown, in some embodiments, the NIC 120 may include one or more processing cores 122 (i.e., processing cores local to the NIC 120). In such embodiments, the processing core(s) 122 may be capable of performing one or more of the functions described herein. In some embodiments, the NIC 120 may additionally include a local memory (not shown). In such embodiments, the local memory of the NIC 120 may be integrated into one or more components of the destination compute device 106 at the board level, socket level, chip level, and/or other levels. In an illustrative embodiment, the NIC 130 may be embodied as single-root I/O virtualization (SR-IOV)-capable NIC and thus include at least one physical function and multiple virtual functions (see, e.g., the illustrative destination compute device 106 of FIG. 3). However, it should be appreciated that the NIC 120 may employ alternative virtualization schemes, or no virtualization scheme at all, depending on the embodiment. Irrespective of the embodiment of the NIC 120 and the type or whether any virtualization scheme is used, it should be further appreciated that the NIC 120 may be embodied as any type of NIC for which the data path configuration can be separated from the control plane configuration to separate physical functions (e.g., Peripheral Component Interconnect Express (PCIe) physical functions).

The one or more peripheral devices 124 may include any type of device that is usable to input information into the destination compute device 106 and/or receive information from the destination compute device 106. The peripheral devices 124 may be embodied as any auxiliary device usable to input information into the destination compute device 106, such as a keyboard, a mouse, a microphone, a barcode reader, an image scanner, etc., or output information from the destination compute device 106, such as a display, a speaker, graphics circuitry, a printer, a projector, etc. It should be appreciated that, in some embodiments, one or more of the peripheral devices 124 may function as both an input device and an output device (e.g., a touchscreen display, a digitizer on top of a display screen, etc.). It should be further appreciated that the types of peripheral devices 124 connected to the destination compute device 106 may depend on, for example, the type and/or intended use of the destination compute device 106. Additionally or alternatively, in some embodiments, the peripheral devices 124 may include one or more ports, such as a USB port, for example, for connecting external peripheral devices to the destination compute device 106. Furthermore, depending on the embodiment, the one or more peripheral devices 124 may include one or more sensors (e.g., temperature sensors, fan sensors, etc.).

The source compute device 102 may be embodied as any type of computation or computer device capable of performing the functions described herein, including, without limitation, a smartphone, a mobile computing device, a tablet computer, a laptop computer, a notebook computer, a computer, a server (e.g., stand-alone, rack-mounted, blade, etc.), a sled (e.g., a compute sled, an accelerator sled, a storage sled, a memory sled, etc.), a network appliance (e.g., physical or virtual), a web appliance, a distributed computing system, a processor-based system, and/or a multiprocessor system. While not illustratively shown, it should be appreciated that source compute device 102 includes similar and/or like components to those of the illustrative destination compute device 106. As such, figures and descriptions of the like/similar components are not repeated herein for clarity of the description with the understanding that the description of the corresponding components provided above in regard to the destination compute device 106 applies equally to the corresponding components of the source compute device 102. Of course, it should be appreciated that the computing devices may include additional and/or alternative components, depending on the embodiment.

The network 104 may be embodied as any type of wired or wireless communication network, including but not limited to a wireless local area network (WLAN), a wireless personal area network (WPAN), an edge network (e.g., a multi-access edge computing (MEC) network), a fog network, a cellular network (e.g., Global System for Mobile Communications (GSM), Long-Term Evolution (LTE), 5G, etc.), a telephony network, a digital subscriber line (DSL) network, a cable network, a local area network (LAN), a wide area network (WAN), a global network (e.g., the Internet), or any combination thereof. It should be appreciated that, in such embodiments, the network 104 may serve as a centralized network and, in some embodiments, may be communicatively coupled to another network (e.g., the Internet). Accordingly, the network 104 may include a variety of other virtual and/or physical network computing devices (e.g., routers, switches, network hubs, servers, storage devices, compute devices, etc.), as needed to facilitate communication between the destination compute device 106 and the source compute device 102, which are not shown to preserve clarity of the description.

Figure 2:
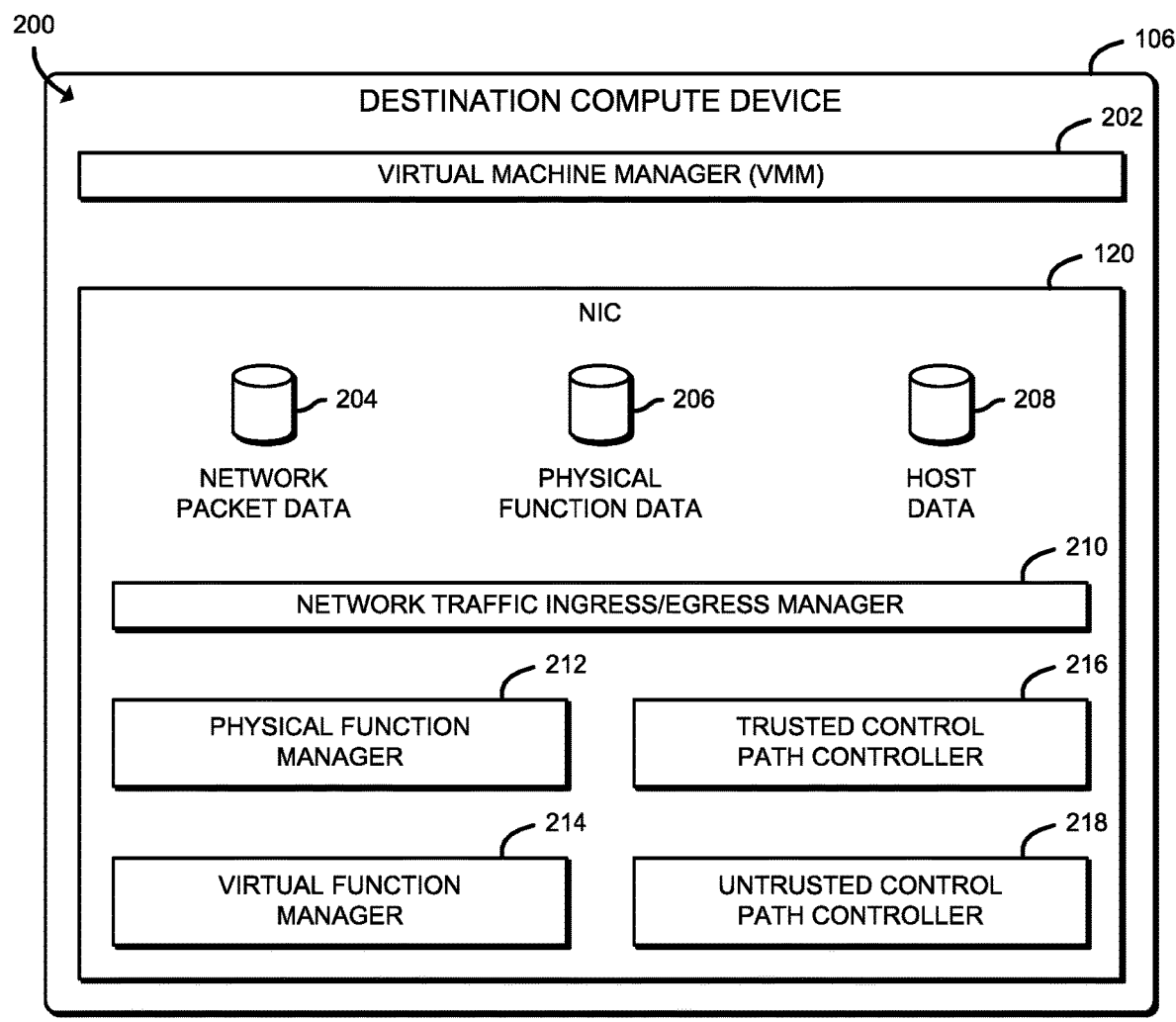
FIG. 2 is a simplified block diagram of at least one embodiment of an environment of the destination compute device of the system of FIG. 1.

Referring now to FIG. 2, in use, the destination compute device 106 establishes an environment 200 during operation. The illustrative environment 200 includes a virtual machine manager 202, a network traffic ingress/egress manager 210, a physical function manager 212, a virtual function manager 214, a trusted control path controller 216, and an untrusted control path controller 218. The various components of the environment 200 may be embodied as hardware, firmware, software, or a combination thereof. As such, in some embodiments, one or more of the components of the environment 200 may be embodied as circuitry or collection of electrical devices (e.g., virtual machine management circuitry 202, network traffic ingress/egress management circuitry 210, physical function management circuitry 212, virtual function management circuitry 214, trusted control path controller circuitry 216, untrusted control path controller circuitry 218, etc.).

As illustratively shown, the network traffic ingress/egress management circuitry 210, the physical function management circuitry 212, the virtual function management circuitry 214, the trusted control path controller circuitry 216, and the untrusted control path controller circuitry 218 form a portion of the NIC 120. However, it should be appreciated that, in other embodiments, one or more functions described herein as being performed by the network traffic ingress/egress management circuitry 210, the physical function management circuitry 212, the virtual function management circuitry 214, the trusted control path controller circuitry 216, and/or the untrusted control path controller circuitry 218 may be performed, at least in part, by one or more other components of the destination compute device 106, such as the compute engine 108, the I/O subsystem 114, the communication circuitry 118, an ASIC, a programmable circuit such as an FPGA, and/or other components of the intermediary compute device 106. It should be further appreciated that associated instructions may be stored in the memory 112, the data storage device(s) 116, and/or other data storage location, which may be executed by one of the processors 110 and/or other computational processor of the destination compute device 106.

Additionally, in some embodiments, one or more of the illustrative components may form a portion of another component and/or one or more of the illustrative components may be independent of one another. Further, in some embodiments, one or more of the components of the environment 200 may be embodied as virtualized hardware components or emulated architecture, which may be established and maintained by the NIC 120, the compute engine 108, or other software/hardware components of the destination compute device 106. It should be appreciated that the destination compute device 106 may include other components, sub-components, modules, sub-modules, logic, sub-logic, and/or devices commonly found in a computing device (e.g., device drivers, interfaces, etc.), which are not illustrated in FIG. 2 for clarity of the description.

In the illustrative environment 200, the destination compute device 106 additionally includes network packet data 204, physical function data 206, and host data 208, each of which may be accessed by the various components and/or sub-components of the destination compute device 106. Further, each of the network packet data 204, the physical function data 206, and the host data 208 may be accessed by the various components of the destination compute device 106. Additionally, it should be appreciated that in some embodiments the data stored in, or otherwise represented by, each of the network packet data 204, the physical function data 206, and the host data 208 may not be mutually exclusive relative to each other. For example, in some implementations, data stored in the network packet data 204 may also be stored as a portion of one or more of the physical function data 206 and/or the host data 208, or in another alternative arrangement. As such, although the various data utilized by the destination compute device 106 is described herein as particular discrete data, such data may be combined, aggregated, and/or otherwise form portions of a single or multiple data sets, including duplicative copies, in other embodiments.

The virtual machine manager 202, which may be embodied as hardware, firmware, software, virtualized hardware, emulated architecture, and/or a combination thereof as discussed above, is configured to create and run virtual machines (VMs). To do so, the virtual machine manager 202 is configured to present a virtual operating platform to guest operating systems and manage the execution of the guest operating systems on the VMs. As such, multiple instances of a variety of operating systems may share the virtualized hardware resources of the destination compute device 106. It should be appreciated that the destination compute device 106 is commonly referred to as a "host" machine with "host" physical resources and each VM is commonly referred to as a "guest" machine with access to virtualized physical/hardware resources of the "host" machine. Depending on the embodiment, the virtual machine manager 202 may be configured to create or otherwise manage the communications between virtual functions and virtual function drivers for assignment to the VMs (see, e.g., the illustrative environment 300 of FIG. 3).

The network traffic ingress/egress manager 210, which may be embodied as hardware, firmware, software, virtualized hardware, emulated architecture, and/or a combination thereof as discussed above, is configured to receive inbound and route/transmit outbound network traffic. To do so, the illustrative network traffic ingress/egress manager 210 is configured to facilitate inbound network communications (e.g., network traffic, network packets, network flows, etc.) to the destination compute device 106. Accordingly, the network traffic ingress/egress manager 210 is configured to manage (e.g., create, modify, delete, etc.) connections to physical and virtual network ports (i.e., virtual network interfaces) of the destination compute device 106 (e.g., via the communication circuitry 118), as well as the ingress buffers/queues associated therewith.

Additionally, the network traffic ingress/egress manager 210 is configured to facilitate outbound network communications (e.g., network traffic, network packet streams, network flows, etc.) from the destination compute device 106. To do so, the network traffic ingress/egress manager 210 is configured to manage (e.g., create, modify, delete, etc.) connections to physical and virtual network ports/interfaces of the destination compute device 106 (e.g., via the communication circuitry 118), as well as the egress buffers/queues associated therewith. In some embodiments, at least a portion of the network packet (e.g., at least a portion of a header of the network packet, at least a portion of a payload of the network packet, at least a portion of a footer of the network packet, etc.) may be stored in the network packet data 202. Additionally or alternatively, in some embodiments, information about the network packet (e.g., a flow/workload type of the network packet, a source of the network packet, a destination of the network packet, a protocol associated with the network packet, etc.) may be stored in the network packet data 204.

The physical function manager 212, which may be embodied as hardware, firmware, software, virtualized hardware, emulated architecture, and/or a combination thereof as discussed above, is configured to manage the initialization and configuration of the physical functions of the NIC 120. In some embodiments, information associated with each physical function of the NIC 120 may be stored in the physical function data 206. Similarly, the virtual function manager 214, which may be embodied as hardware, firmware, software, virtualized hardware, emulated architecture, and/or a combination thereof as discussed above, is configured to manage the initialization and configuration of the virtual functions of the NIC 120.

It should be appreciated that each of the virtual functions may operate under a respective physical function (e.g., on the same port of the NIC 120) and therefore might not have access to the global resources of the NIC 120 that are shared between other functions (e.g., for the same NIC port). It should be further appreciated that each virtual function typically has basic access to the queue resources and control structures of the queues assigned to it. Accordingly, for global resource access, a virtual function sends a request to the physical function (e.g., for that particular port), and the physical function operates on the global resources on behalf of the virtual function. Additionally, this out-of-band communication in a single root I/O virtualization (SR-IOV) enabled NIC 120 can provide a memory buffer for each virtual function, commonly referred to as a "mailbox".

The trusted control path controller 216, which may be embodied as hardware, firmware, software, virtualized hardware, emulated architecture, and/or a combination thereof as discussed above, is configured to manage the control path between the trusted hosts and the control path of the NIC 120. In other words, the trusted control path controller 216 is configured to manage the traditional control path similar to present technologies for those hosts whose access to physical functions is not restricted, such as the traditional physical functions and the control physical functions (i.e., not the untrusted physical functions). In some embodiments, information associated with each host to which a virtual function is communicatively coupled may be stored in the host data 208.

The untrusted control path controller 218, which may be embodied as hardware, firmware, software, virtualized hardware, emulated architecture, and/or a combination thereof as discussed above, is configured to manage the control path between the untrusted hosts and the control path of the NIC 120. In other words, the untrusted control path controller 218 is configured to manage the separated control plane to sanitize requests (e.g., hardware access requests) from untrusted hosts. As such, the untrusted control path controller 218 is configured to provide curated access for untrusted hosts to configure the NIC 120 without providing access through a physical function that could otherwise be exploited. Accordingly, by separating the data plane from the control plane different modes of operation for each physical function on the NIC 120 can be toggled. In this way, the host/provider (e.g., cloud host/service provider) can retain control of the destination compute device 106 and the network configuration, while allowing a tenant with fast direct-to-hardware network performance and expanded capabilities of flow load balancing.

Figure 3:
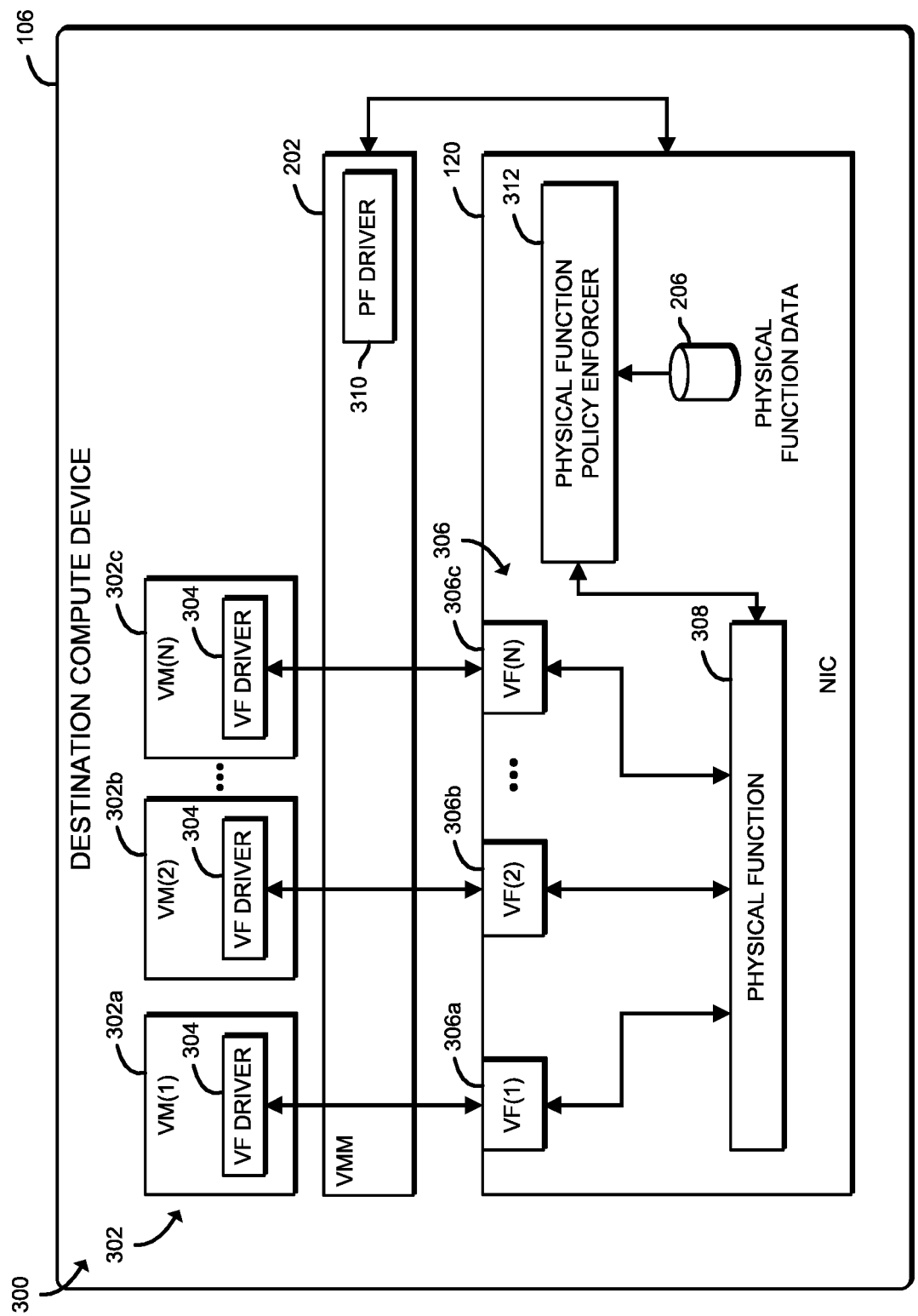
FIG. 3 is a simplified block diagram of at least one embodiment of another environment of the destination compute device of the system of FIG. 1.

Referring now to FIG. 3, in another illustrative embodiment, the destination compute device 106 establishes an environment 300 during operation. The illustrative environment 300 includes a plurality of VMs 302 illustratively shown as being presently executed on the destination compute device 106, each of which is communicatively coupled to one of a plurality of virtual functions 306 of the NIC 120. The illustrative VMs 302 include a first VM, which is designated as VM (1) 302a, a second VM, which is designated as VM (2) 302b, and a third VM, which is designated as VM (N) 302c (i.e., the "Nth" VM of the VMs 302, wherein "N" is a positive integer and designates one or more additional VMs 302).

The illustrative virtual functions 306 include a first virtual function designated as VF (1) 306a, a second virtual function designated as VF (2) 306b, and a third virtual function designated as VF (N) 306c (i.e., the "Nth" virtual function of the virtual functions 306, wherein "N" is a positive integer and designates one or more additional virtual functions 306). Each of the virtual functions 306 are illustratively shown as being communicatively coupled to a physical function 308. The physical function 308 is configured to be discovered, managed, and manipulated like any other peripheral device (e.g., a PCIe device). For example, the physical function 308 may be embodied as a virtualized PCI function that is capable of performing a given functionality of the NIC 120. Accordingly, the physical function 308 is configured to have full configuration access to resources such that the physical function 308 can configure, assign, or otherwise control a physical resource of the NIC 120. As such, depending on embodiment, the NIC 120 can present multiple virtual instances of itself to multiple hosts (e.g., to a VM 302, a container, a hypervisor, a processor core, etc.).

Additionally, the physical function 308 is configured to move data in and out of the NIC 120. It should be appreciated that while the VFs 306 are similar to physical function 308, the VFs 306 only have the ability to move data in and out, they cannot configure the NIC 120. As such, configuration can only be done against the physical function 308. While illustratively shown as each of the virtual functions 306 being directly coupled to the physical function 308, it should be appreciated that additional technologies may be employed to facilitate communication therebetween, such as a virtual Ethernet bridge (VEB).

As described previously, each of the virtual functions 306 are configured to operate under the physical function 308. However, it should be appreciated that, while only a single physical function 308 is illustratively shown in the environment 300, there are typically multiple physical functions 308 (e.g., per port) on the NIC 120. As such, while not illustratively shown, it should be appreciated that each physical function 308 includes one or more corresponding virtual functions 306 that are communicatively coupled to a respective VM 302, also referred to herein as a "host".

The physical function 308 is illustratively shown as being communicatively coupled to a physical function policy enforcer 312, which may be embodied as hardware, firmware, virtualized hardware, emulated architecture, and/or a combination thereof, that is configured to enforce policies associated with each physical function. It should be appreciated that the physical function policy enforcer 312 should be implemented so as to not be susceptible to a software workaround. Depending on the embodiments, the physical function policies may include any information usable to instantiate, configure, or otherwise manage operations of the physical function 308, including, for example, load balancing policies, mappings of physical functions to a given port of the NIC 120, etc. As shown, the illustrative NIC 120 additionally includes the physical function data 206 of FIG. 2, in which the physical function policies may be stored.

The illustrative environment 300 additionally includes the VMM 202 of FIG. 2. As described previously, the VMM 202 is configured to expose the virtual functions to each of the instantiated VMs 302. As illustratively shown, the VMM 202 is configured to manage the communications between each VM 302 (e.g., via a respective virtual function driver 304) and the respective virtual functions 306. While illustratively shown as residing on the same compute device, it should be appreciated that, in some embodiments, one or more of the VMs 302 may be spawned on one or more other compute devices communicatively coupled to the destination compute device 106. It should be further appreciated that, while illustratively described herein as being embodied as one or VMs 302, the destination compute device 106 may include one or more containers in addition to or as an alternative to the VMs 302.

The illustrative VMM 202 includes a physical function driver 310 that may be embodied as hardware, firmware, software, virtualized hardware, emulated architecture, and/or a combination thereof, which is configured to manage configuration of the control plane of the NIC 120. Such configuration settings may include controlling link speed, link state, one or more quality of service (QoS) settings, etc., performing traffic encapsulation, encryption, device resets, etc., and the like. Depending on the embodiment, additional control may be provided by an agent such as the BMC, a link-partner switch (via, e.g., Data Center Bridging Capability Exchange (DCBx)), or firmware of the NIC 120. The physical function driver 310 is additionally configured to respond to requests for resources received from the virtual function driver 304. While illustratively described as including the VMM 202, in some embodiments, the destination compute device 106 may only include a single untrusted physical function. Accordingly, in such embodiments, it should be appreciated that the destination compute device 106 may not include the VMM 202.

In addition to control plane configuration, the physical function driver 310 is also configured to manage the configuration of the data plane of the NIC 120 (e.g., the network traffic ingress/egress manager 210 of FIG. 2) by enabling/disabling hardware transmit and receive rings to control the network traffic. It should be appreciated that in a virtualized deployment, the virtual function driver 304, a virtual network function (VNF) application (not shown), or an equivalent, is typically configured to manage the configuration of the data plane for the VMs 302. However, the physical function driver 310 generally retains control of the actual physical hardware of the NIC 120, and the virtual function driver 304, the VNF application, or equivalent, are limited in their capabilities and are typically configured to use the physical function driver 310 as a proxy for any hardware configuration.

Accordingly, since the physical function driver 310 runs as part of the operating system kernel, or hypervisor, depending on the embodiment, it is assumed to be trusted. As such, in simple hosting cases, such an assumption holds true, as the provider rather than the tenant controls the kernel space in which physical function driver 310 executes, and security is provided by the kernel/user-space dichotomy. However, such a model fails to provide security when a tenant has direct access to the networking hardware, and thus can do all the same things a regular physical function driver 310 can expose the provider's infrastructure and network, as well as other tenants to be a target of attacks by malicious or compromised tenants, since at least a part of the kernel space of the destination compute device 106 is made readily accessible to those malicious or compromised tenants.

Figure 4:
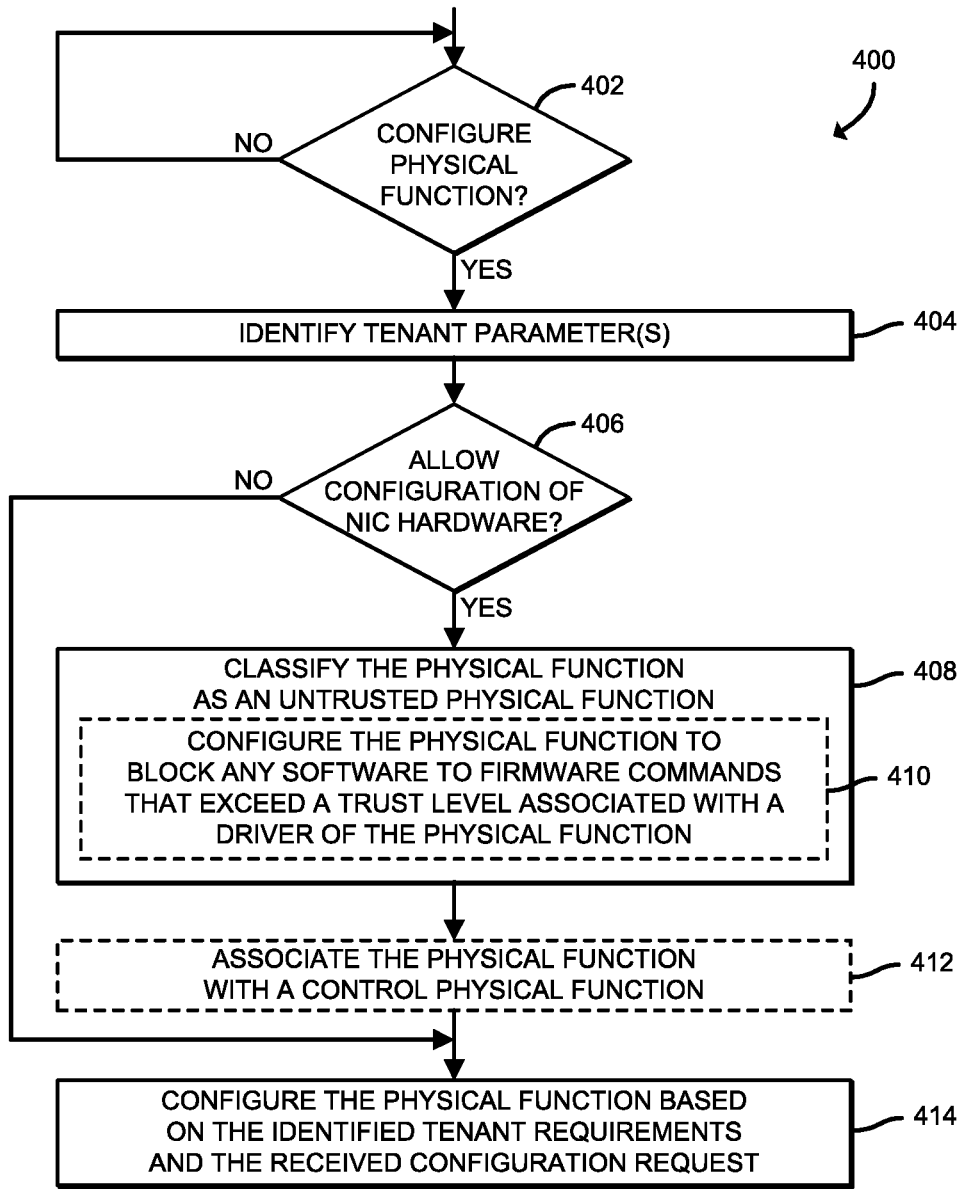
FIG. 4 is a simplified flow diagram of at least one embodiment of a method for configuring a physical function of a NIC that may be executed by the destination compute device of FIGS. 1-3.

Referring now to FIG. 4, a method 400 for configuring a physical function of a NIC (e.g., the NIC 120 of the destination compute device 106) is shown which may be executed at least in part by physical function configuration management capable hardware, software, and/or firmware residing on or otherwise communicatively coupled to the NIC 120. The method 400 begins with block 402, in which the NIC 120 determines whether to configure a physical function of the NIC 120 for a tenant of a cloud host/service provider. For example, the determination may be made in response to a physical host configuration request having been received, such as from an administrator of the host/provider to which the destination compute device 106 belongs, as a result of an update to a policy associated with a tenant to which the physical function corresponds, etc.

If the NIC 120 determines that the physical function is to be configured, the method 400 advances to block 404, in which the NIC 120 identifies one or more tenant parameters. The tenant parameters may include any information usable to determine how to configure the physical function, as well as a level of access/trust to be associated with the physical function. It should be appreciated that while illustratively described herein as a host/physical function being trusted versus untrusted, different levels of trust can be also defined (e.g., to suit different provider and customer security and functionality needs), depending on the embodiment.

In block 406, the NIC 120 determines whether to allow direct access to configure hardware of the NIC 120. As described previously, only those hosts that are considered to be trusted should be given direct access to configure hardware of the NIC 120. If the NIC 120 determines to allow the physical function direct access to configure hardware of the NIC 120, the method 400 jumps to block 414, which is described below; otherwise, the method 400 proceeds to block 408. In block 408, the NIC 120 classifies the physical function as an untrusted physical function. To do so, for example, in block 410, the NIC 120 may configure the physical function to block any software to firmware commands that exceed a trust level associated with a driver of the physical function.

In block 412, depending on the embodiment, the NIC 120 may associate the physical function (i.e., the untrusted physical function) with a control physical function. As described previously, a control physical function is a physical function that is capable of performing control plane functionality (e.g., hardware configuration changes) requested by an associated untrusted physical function to neutralize a potential attack surface by sanitizing such requests. Accordingly, the same physical hardware of the NIC 120 can expose different capabilities for each of its different physical functions, thus allowing the host/provider to segregate tenants as needed. As such, present solutions which employ specialized switches and other networking hardware are generally no longer required. In block 414, the NIC 120 configures the physical function based on the identified tenant requirements and the received configuration request.

Figure 5:
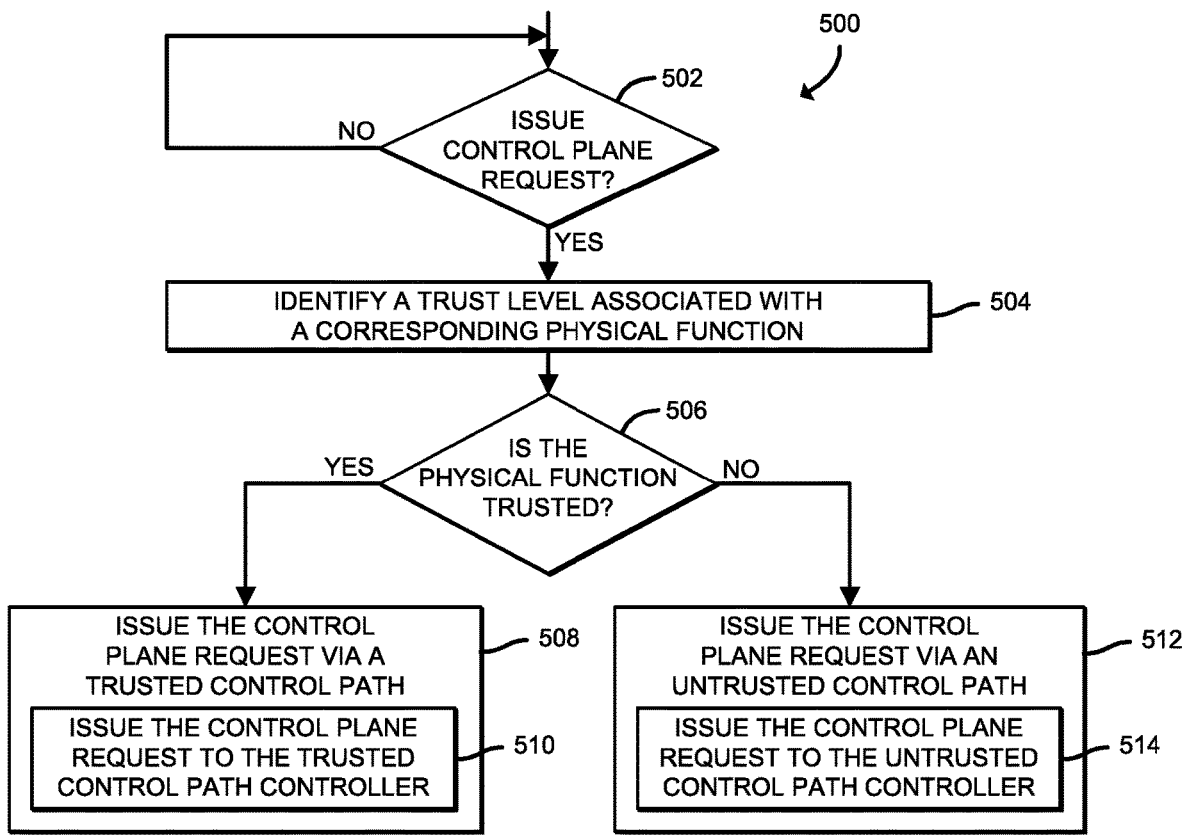
FIG. 5 is a simplified flow diagram of at least one embodiment of a method for issuing control plane requests to a NIC that may be executed by the destination compute device of FIGS. 1-3.

Referring now to FIG. 5, a method 500 for issuing control plane requests to a NIC (e.g., the NIC 120 of the destination compute device 106) is shown which may be executed at host of the destination compute device 106 (e.g., a VM, a hypervisor, a container, etc.). The method 500 begins with block 502, in which the host determines whether a control plane request is to be issued. If so, the method 500 advances to block 502, in which the host identifies a trust level associated with a corresponding physical function (e.g., a trust level associated with a driver of the physical function, a type associated with the physical function, etc.) that is to receive the control plane request.

In block 506, the host determines whether the physical function is a trusted physical function based on the identified trust level. For example, the host may determine whether the physical function has access to configure hardware of the NIC 120, or whether such access has been restricted. In other words, the host determines whether the physical function is an untrusted physical function or not. As described previously, untrusted physical functions do not have the ability to perform slow path operations (e.g., issue device resets, change the link configuration, write sensitive/device wide registers, update the device firmware, etc.), and are limited to performing fast path traffic processing operations. Depending on the embodiment, the slow path operations can be abstracted through control commands executed by the internal firmware or the control physical function, which can then apply the right access control lists (ACLs) to define which commands are allowed for each physical function.

If the host determines that the physical function is a trusted physical function (e.g., access to configure hardware of the NIC 120 has not been restricted), the method 500 branches to block 508, in which the host issues the control plane request via a trusted control path. To do so, in block 510, the host issues the control plane request to a trusted control path controller (e.g., the trusted control path controller 216 of FIG. 2). Otherwise, referring back to block 506, if the host determines that the physical function is an untrusted physical function (e.g., access to configure hardware of the NIC 120 has been restricted), the method 500 branches to block 512, in which the host issues the control plane request via an untrusted control path (i.e., via a separated control plane). To do so, in block 514, the host issues the control plane request to an untrusted control path controller (e.g., the untrusted control path controller 218 of FIG. 2). Depending on the embodiment, the untrusted physical function may be supplied with a mailbox to the control physical function/firmware that is in charge of its configuration, depending on the embodiment.

In alternative embodiments to control the access of physical functions the NIC 120 may be configured to allow the hardware/internal firmware of the NIC 120 to trap access of specific physical functions to groups of configuration registers and if the physical function is allowed to do a requested configuration, remove the trap and let the physical function access the configuration register(s). In such embodiments, an untrusted physical function starts with all accesses being trapped, after the fast-path configuration is "granted," the traps are removed and reads/writes are serviced by the appropriate hardware of the NIC 120.

Figure 6:
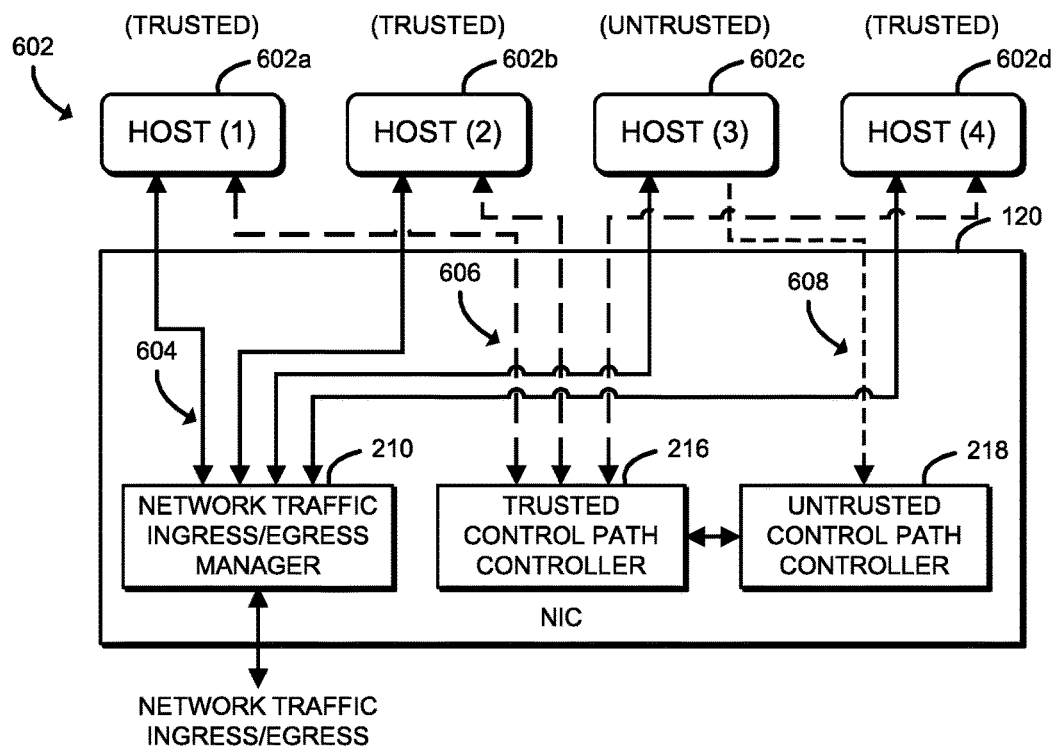
FIG. 6 is a simplified block diagram of at least one embodiment for control plane separation at the destination compute device of FIGS. 1-3 in which the control plane is separated onto a core of the NIC.

As described previously, the control plane is separated and relocated to a different, trusted entity. For example, the control plane separation may be applied to various embodiments of any PCIe NIC, as illustratively shown in FIGS. 6-8. Referring now to FIG. 6, an illustrative embodiment of a PCIe NIC with control plane separation is shown in which the control plane is separated into a local processor core of the NIC 120 (e.g., one of the core(s) 122 of FIG. 1). In other words, the NIC 120 includes the untrusted control path controller 218 (e.g., the separated control plane) embedded thereon. The NIC 120 is communicatively coupled to multiple hosts 602. The illustrative hosts 602 include a first host designated as host (1) 602a, a second host designated as host (2) 602b, a third host designated as host (3) 602c, and a fourth host designated as host (3) 602d. As described previously, the data path 604 remains unchanged, such that each host 602 uses the same data path, illustratively shown as the network traffic ingress/egress manager 210 of FIG. 2, to access network traffic ingress/egress queues directly, irrespective of whether they are trusted or untrusted.

As described previously, each host may be embodied as a VM (e.g., one of the VMs 302 of FIG. 3) and is associated with a physical function (e.g., the physical function 308 of FIG. 3). It should be appreciated that each of the physical functions, and therefore each of the hosts 602, are classified as being trusted or untrusted, as described herein. As illustratively shown, each of the host (1) 602a, the host (2) 602b, and the host (4) 602d are classified as trusted hosts (e.g., based on the respective physical functions associated therewith being trusted physical functions), whereas the host (3) 602c is classified as being untrusted (e.g., based on the physical function associated therewith being an untrusted physical function). Accordingly, each of the host (1) 602a, the host (2) 602b, and the host (4) 602d transmit control plane commands along the trusted control path 606 to the trusted control path controller 216; whereas the host (3) 602c transmits control plane commands along the untrusted control path 608.

Figure 7:
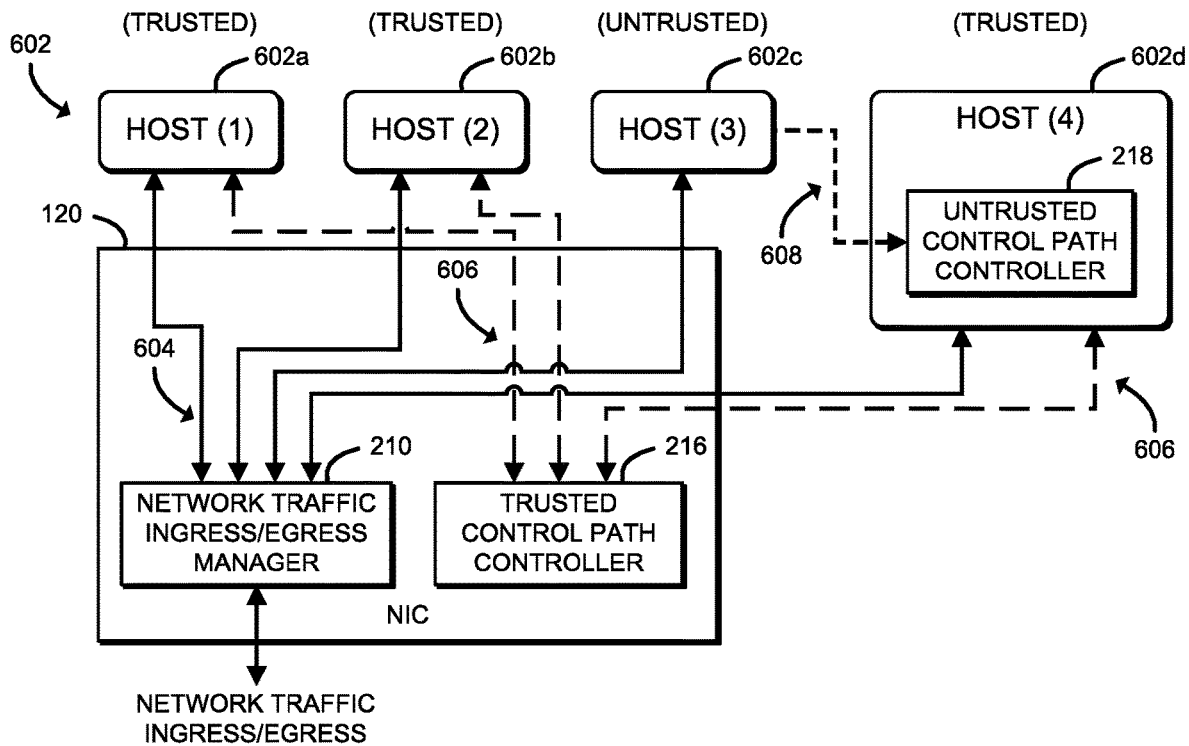
FIG. 7 is a simplified block diagram of at least one other embodiment for control plane separation at the destination compute device of FIGS. 1-3 in which the control plane is separated into a control physical function.

Referring now to FIG. 7, an illustrative embodiment of a PCIe NIC with control plane separation is shown in which the control plane is separated into another host 602 configured to be associated with a control physical function. As illustratively shown, the untrusted control path controller 218 (e.g., the separated control plane) is deployed in the host (4) 602d which is associated with a control physical function that serves as a trusted physical function capable of providing curated access to configuration of the NIC 120. Accordingly, the untrusted control path 608 resides between the host (3) 602c and the host (4) 602d.

Figure 8:
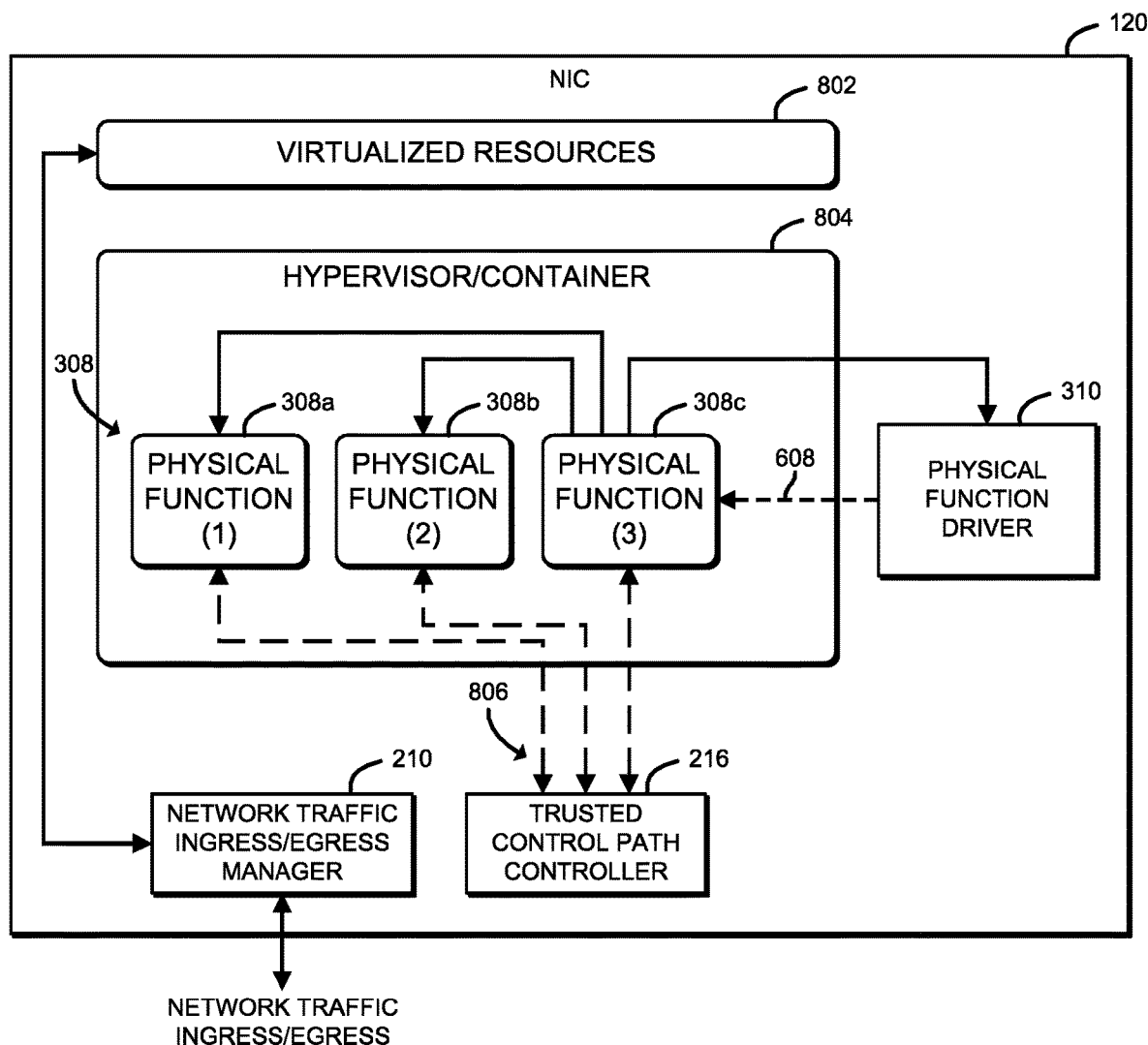
FIG. 8 is a simplified block diagram of at least one other embodiment for control plane separation at the destination compute device of FIGS. 1-3 in which the control plane is separated to a physical function driver with restricted access.

Referring now to FIG. 8, an illustrative embodiment of a PCIe NIC (e.g., with PCIe passthrough, an SR-IOV virtual device composition module (VDCM), etc.) with control plane separation is shown in which the control plane is separated into a hypervisor/container 804 that has ownership of the control plane. As illustratively shown, the physical function driver 310 can be access restricted and proxy configuration requests received from the physical function 308c, effectively neutralizing the attack surface between the physical function driver 310 and the physical functions 308 residing on the hypervisor/container 804. The illustrative embodiment additionally includes virtualized resources 802 which may be embodied as one or more virtual functions, virtual devices, etc., depending on the embodiment.

EXAMPLES

Illustrative examples of the technologies disclosed herein are provided below. An embodiment of the technologies may include any one or more, and any combination of, the examples described below.

Example 1 includes a compute device for control plane separation in a network interface controller (NIC), the compute device comprising a compute engine to manage a plurality of resources of the compute device; a NIC that provides access to a physical function managed by the NIC, wherein at least one of the plurality of resources are to access the physical function, wherein the NIC establishes a data plane separate from a control plane, and wherein the control plane comprises one of a trusted control path and an untrusted control path; and one or more memory devices having stored therein a plurality of instructions that, when executed by the compute engine, causes the at least one of the plurality of resources to transmit commands to the physical function via one of the trusted control path or the untrusted control path based on a trust level associated with the physical function.

Example 2 includes the subject matter of Example 1, and wherein the NIC is to classify the physical function as an untrusted physical function based on the trust level associated with the physical function.

Example 3 includes the subject matter of any of Examples 1 and 2, and wherein the trust level associated with the physical function is based on whether the physical function has direct access to hardware of the NIC.

Example 4 includes the subject matter of any of Examples 1-3, and further including trusted control path controller circuitry to manage the trusted control path; and untrusted control path controller circuitry to manage the untrusted control path.

Example 5 includes the subject matter of any of Examples 1-4, and wherein the trusted control path controller circuitry and the trusted control path controller circuitry reside on the NIC.

Example 6 includes the subject matter of any of Examples 1-5, and wherein the trusted control path controller circuitry resides on the NIC and the trusted control path controller circuitry resides on another resource of the compute device.

Example 7 includes the subject matter of any of Examples 1-6, and wherein the other resource is associated with another physical function that is to function as a control physical function to curate access requests to the physical function.

Example 8 includes the subject matter of any of Examples 1-7, and wherein the trusted control path controller circuitry resides on the NIC and the trusted control path controller circuitry resides on one of a hypervisor of the NIC or in a container of the NIC.

Example 9 includes the subject matter of any of Examples 1-8, and wherein at least one of the plurality of resources is a virtualized resource, and wherein the virtualized resource comprises one of a virtual machine or a container.

Example 10 includes one or more machine-readable storage media comprising a plurality of instructions stored thereon that, in response to being executed, cause a compute device to transmit, by at least one of a plurality of resources of the compute device, commands to a physical function managed by a network interface controller (NIC) of the compute device, wherein the NIC establishes a data plane separate from a control plane, wherein the control plane comprises one of the trusted control path and the untrusted control path, and wherein to transmit the commands comprises to transmit the commands via one of the trusted control path or the untrusted control path based on a trust level associated with the physical function.

Example 11 includes the subject matter of Example 10, and wherein the NIC is to classify the physical function as an untrusted physical function based on the trust level associated with the physical function.

Example 12 includes the subject matter of any of Examples 10 and 11, and wherein the trust level associated with the physical function is based on whether the physical function has direct access to hardware of the NIC.

Example 13 includes the subject matter of any of Examples 10-12, and wherein the trusted control path and the trusted control path reside on the NIC.

Example 14 includes the subject matter of any of Examples 10-13, and wherein the trusted control path resides on the NIC and the trusted control path resides on another resource of the compute device.

Example 15 includes the subject matter of any of Examples 10-14, and wherein the other resource is associated with another physical function that is to function as a control physical function to curate access requests to the physical function.

Example 16 includes the subject matter of any of Examples 10-15, and wherein the trusted control path resides on the NIC and the trusted control path resides on one of a hypervisor of the NIC or in a container of the NIC.

Example 17 includes the subject matter of any of Examples 10-16, and wherein at least one of the plurality of resources is a virtualized resource, and wherein the virtualized resource comprises one of a virtual machine or a container.

Example 18 includes a method for control plane separation in a network interface controller (NIC), the method comprising transmitting, by at least one of a plurality of resources of a compute device, commands to a physical function managed by a NIC of the compute device, wherein the NIC establishes a data plane separate from a control plane, wherein the control plane comprises one of the trusted control path and the untrusted control path, and wherein transmitting the commands comprises transmitting the commands via one of the trusted control path or the untrusted control path based on a trust level associated with the physical function.

Example 19 includes the subject matter of Example 18, and further including classifying, by the NIC, the physical function as an untrusted physical function based on the trust level associated with the physical function.

Example 20 includes the subject matter of any of Examples 18 and 19, and wherein the trust level associated with the physical function is based on whether the physical function has direct access to hardware of the NIC.

Example 21 includes the subject matter of any of Examples 18-20, and wherein the trusted control path and the trusted control path reside on the NIC.

Example 22 includes the subject matter of any of Examples 18-21, and wherein the trusted control path resides on the NIC and the trusted control path resides on another resource of the compute device.

Example 23 includes the subject matter of any of Examples 18-22, and wherein the other resource is associated with another physical function that is to function as a control physical function to curate access requests to the physical function.

Example 24 includes the subject matter of any of Examples 18-23, and wherein the trusted control path resides on the NIC and the trusted control path resides on one of a hypervisor of the NIC or in a container of the NIC.

Example 25 includes the subject matter of any of Examples 18-24, and wherein at least one of the plurality of resources is a virtualized resource, and wherein the virtualized resource comprises one of a virtual machine or a container.

The invention claimed is:

1. An apparatus comprising:
a network interface controller (NIC) to include circuitry, the circuitry to:
provide access to a physical function of the NIC by a plurality of resources coupled with the NIC;
establish a data plane separate from a control plane for access to the physical function, the control plane to include a trusted control path and an untrusted control path;
receive control plane requests directed to the physical function from the plurality of resources via one of the trusted control path or the untrusted control path based on a trust level associated with the physical function, the trust level used to determine whether the physical function is an untrusted physical function with restricted access to hardware of the NIC;
manage, by trusted control path controller circuitry included in the circuitry, control plane requests received via the trusted control path directed to trusted physical functions; and
manage, by untrusted control path controller circuitry included in the circuitry, control plane requests received via the untrusted control path directed to untrusted physical functions.

2. The apparatus of claim 1, wherein the trust level associated with the physical function is based on whether the physical function has direct access to hardware of the NIC.

3. The apparatus of claim 1, further comprising the untrusted control path controller circuitry is to manage the control plane requests received via the untrusted control path by sanitizing the control plane requests.

4. The apparatus of claim 1, wherein the untrusted control path controller circuitry is associated with another physical function that is to function as a control physical function to curate access requests to the physical function.

5. The apparatus of claim 1, wherein at least one of the plurality of resources is a virtualized resource, and wherein the virtualized resource comprises one of a virtual machine or a container.

6. One or more non-transitory machine-readable storage media comprising a plurality of instructions stored thereon that, in response to being executed, cause a compute device to:
transmit, by at least one of a plurality of resources of the compute device, control plane requests to a physical function managed by a network interface controller (NIC) coupled with the compute device,
wherein circuitry of the NIC has established a data plane separate from a control plane for access to the physical function,
wherein the control plane includes a trusted control path and an untrusted control path,
wherein to transmit the control plane requests includes to transmit the control plane requests via one of the trusted control path or the untrusted control path based on a trust level associated with the physical function, the trust level used to determine whether the physical function is an untrusted physical function with restricted access to hardware of the NIC, and wherein control plane requests transmitted via the trusted control path towards trusted physical functions are to be managed by a trusted control path controller circuitry, while control plane requests transmitted via the untrusted control path towards untrusted physical functions are to be managed by an untrusted control path controller.

7. The one or more non-transitory machine-readable storage media of claim 6, wherein the trust level associated with the physical function is based on whether the physical function has direct access to hardware of the NIC.

8. The one or more non-transitory machine-readable storage media of claim 6, wherein the trusted control path and the untrusted control path are both routed on the NIC.

9. The one or more non-transitory machine-readable storage media of claim 6, wherein the trusted control path is routed to the trusted control path controller circuitry that resides on the NIC and the untrusted control path is routed to another resource of the compute device.

10. The one or more non-transitory machine-readable storage media of claim 9, wherein the other resource is associated with another physical function that is to function as the untrusted control path controller to curate control plane requests to the physical function via the untrusted control path.

11. The one or more non-transitory machine-readable storage media of claim 6, wherein the trusted control path is routed to the trusted control path controller circuitry that resides on the NIC and the untrusted control path is routed to one of a hypervisor or a container, the hypervisor or the container to function as the untrusted control path controller.

12. The one or more non-transitory machine-readable storage media of claim 6, wherein at least one of the plurality of resources is a virtualized resource, and wherein the virtualized resource comprises one of a virtual machine or a container.

13. A method for control plane separation at a network interface controller (NIC), the method comprising:
transmitting, by at least one of a plurality of resources of a compute device, control plane requests to a physical function managed by a network interface controller (NIC) coupled with the compute device,
wherein circuitry of the NIC has established a data plane separate from a control plane for access to the physical function,
wherein the control plane includes a trusted control path and an untrusted control path,
wherein transmitting the control plane requests includes to transmit the control plane requests via one of the trusted control path or the untrusted control path based on a trust level associated with the physical function, the trust level used to determine whether the physical function is an untrusted physical function with restricted access to hardware of the NIC, and
wherein control plane requests transmitted via the trusted control path towards trusted physical functions are to be managed by a trusted control path controller circuitry, while control plane requests transmitted via the untrusted control path towards untrusted physical functions are to be managed by an untrusted control path controller.

14. The method of claim 13, wherein the trust level associated with the physical function is based on whether the physical function has direct access to hardware of the NIC.

15. The method of claim 13, wherein the trusted control path and the untrusted control path are both routed on the NIC.

16. The method of claim 13, wherein the trusted control path is routed to the trusted control path controller circuitry that resides on the NIC and the untrusted control path is routed to another resource of the compute device.

17. The method of claim 16, wherein the other resource is associated with another physical function that is to function as the untrusted control path controller to curate control plane requests to the physical function via the untrusted control path.

18. The method of claim 13, wherein the trusted control path is routed to the trusted control path controller circuitry that resides on the NIC and the untrusted control path is routed to one of a hypervisor or a container, the hypervisor or the container to function as the untrusted control path controller.

19. The method of claim 13, wherein at least one of the plurality of resources is a virtualized resource, and wherein the virtualized resource comprises one of a virtual machine or a container.

20. One or more non-transitory machine-readable storage media comprising a plurality of instructions stored thereon that, in response to being executed, cause a compute device to: route control plane requests from a plurality of resources of the compute device to one of a trusted physical function or an untrusted physical function that are both serviced by a network interface controller (NIC) coupled with the compute device, wherein control plane requests directed to the trusted physical function are routed via a trusted control path of a control plane and control plane requests directed to untrusted physical functions are routed via an untrusted control path of the control plane, and wherein the control plane is separate from a data plane that is established for access to the trusted physical function or for access to the untrusted physical function.

21. The one or more non-transitory machine-readable storage media of claim 20, wherein a physical function is identified as a trusted physical function based on the physical function having direct access to hardware that resides at the NIC.

22. The one or more non-transitory machine-readable storage media of claim 20, wherein at least one of the plurality of resources is a virtualized resource, and wherein the virtualized resource comprises one of a virtual machine or a container.

* * * * *